(12) United States Patent
Mei

(10) Patent No.: US 6,837,111 B2
(45) Date of Patent: Jan. 4, 2005

(54) VARIABLE CAPACITANCE MEASURING DEVICE

(75) Inventor: Hai Mei, Plano, TX (US)

(73) Assignee: Mykrolis Corporation, Billerica, MA (US)

( * ) Notice: Subject to any disclaimer, the term of this patent is extended or adjusted under 35 U.S.C. 154(b) by 101 days.

(21) Appl. No.: 10/228,612

(22) Filed: Aug. 27, 2002

(65) Prior Publication Data

US 2003/0233883 A1 Dec. 25, 2003

Related U.S. Application Data

(63) Continuation-in-part of application No. 10/178,170, filed on Jun. 24, 2002.

(51) Int. Cl.$^7$ ................................................ G01L 9/12
(52) U.S. Cl. ........................................................ 73/718
(58) Field of Search ................ 73/718, 724; 361/283.1, 361/283.2, 283.3, 283.4

(56) References Cited

U.S. PATENT DOCUMENTS

| | | | |
|---|---|---|---|
| 4,135,936 A | | 1/1979 | Ballard, Jr. ................. 106/39.6 |
| 4,414,282 A | | 11/1983 | McCollister et al. ....... 428/433 |
| 4,536,203 A | | 8/1985 | Kramer ......................... 65/29 |
| 4,823,603 A | | 4/1989 | Ferran et al. .................. 73/724 |
| 5,396,803 A | * | 3/1995 | Ferran .......................... 73/724 |
| 5,820,989 A | | 10/1998 | Reed et al. .................. 428/426 |
| 5,939,639 A | * | 8/1999 | Lethbridge .................... 73/724 |

OTHER PUBLICATIONS

*How to Select and Use Capacitance Diaphragm Gauges*, Millipore, A Vacuum Applications Guide, Millipore Corporation, 16 pgs., 2000.

*Glass–Mica Composites, Mykroy/Mycalex Ceramics*, Spaulding Composites Co., http://www.mykroy–mycalex.com/prop5.htm, 4 pgs.

Anthony Rollett, *Heat Treatment of Glass–Ceramics*, Carnetie Mellon University, 4 pgs.

"Glass–Ceramics: Everything you need to know", 3 pgs.

Stroud, J.S., *Property Sheet*, Schott Glass Technologies Inc., Duryea, PA, 8 pgs., 1997.

Henderson, et al., *Determination of the Optimum Crystallization Conditions of a High Thermal Expansion Glass–Ceramic*, Monsanto Research Corporation for the U.S. Dept. of Energy, 9 pgs. 1984.

*Introduction to Mica*, Inderchand Rajgarhia & Sons (P) Ltd, http://www.icrmica.com/icrmica__mica__introduction.htm, 2 pgs.

Schott Glas, *Types of Technical Glasses*, pp. 2–39, Mainz, 2000.

Shcott Glas, *Electronic Packaging Glass—to—Metal Seals*, 24 pgs.

* cited by examiner

Primary Examiner—William Oen
(74) Attorney, Agent, or Firm—Sprinkle IP Law Group

(57) ABSTRACT

A variable capacitance measuring device can comprise a glass-ceramic insulator having a coefficient of thermal expansion that closely matches the coefficient of thermal expansion of a metallic materials used within the device. The glass-ceramic material may chemically bond to the surfaces of the metallic materials to provide a hermetic seal and eliminate the need for a separate glass seal or grooves within the electrode assembly. Additionally, a single-piece electrode assembly can be used instead of a separate electrode assembly (for the electrical feedthrough) and electrode. A shim may be used during the formation of the insulating material to reduce the likelihood of the insulator adhering to surfaces of the electrode portion during the manufacturing process. Also, separate bake-out and getter activation cycles may be combined into a single heat cycle.

16 Claims, 3 Drawing Sheets

VARIABLE CAPACITANCE MEASURING DEVICE

RELATED APPLICATION

This application is a continuation-in-part of U.S. patent application Ser. No. 10/178,170 entitled "Variable Capacitance Measuring Device" by Mei filed Jun. 24, 2002. This application claims priority under 35 U.S.C. § 120 to that prior application, which is assigned to the current assignee hereof and incorporated herein by reference.

FIELD OF THE INVENTION

This invention relates in general to variable capacitance measuring devices, and more particularly, to variable capacitance measuring devices used as force or pressure sensors, components within the devices, and process for making them.

DESCRIPTION OF THE RELATED ART

Many pressure sensors include a variable capacitor to determine pressure. Some of these pressure sensors may include an insulator between a metallic electrode assembly and a reference-side ring of the capacitor. If the coefficient of thermal expansion for the insulator significantly differs from the coefficient of thermal expansion of the electrode assembly and reference-side ring, the readings of the capacitor may be distorted due to the difference in coefficients of thermal expansion.

One attempt to solve the problem with differences in coefficients of thermal expansion is to use an insulating material with a coefficient of thermal expansion closer to the coefficient of thermal expansion of the metallic electrode assembly and reference-side ring. In one example, a specific glass-mica composite has a coefficient similar to that of INCONEL 718™ used for the electrode assembly and reference-side ring within the variable capacitor.

Because the glass-mica composite does not adhere well to INCONEL 718™, a separate glass seal is used between the composite and metallic materials. The glass seal is relatively difficult to use (apply and cure) and grooves in the electrode assembly and reference-side ring are used to increase the migration path for contaminants to migrate from an external ambient to the reference side of the sensor.

The glass-mica insulating material is typically moulded. Typically, a silicon-based spray is used within the mould to aid in the release of the glass-mica material at the end of the moulding operation. Unfortunately, part of the silicon-based spray can potentially adhere to the glass-mica material and can be a contamination source on the reference side of the sensor.

SUMMARY OF THE INVENTION

A variable capacitance measuring device can comprise a glass-ceramic insulator that may chemically bond to the surfaces of the electrode assembly and reference-side ring to provide a hermetic seal. A separate glass seal or grooves are not needed. Additionally, a single-piece electrode assembly can be used instead of a separate electrode assembly (for the electrical feedthrough) and electrode. Therefore, a high-quality variable capacitor may be made using a manufacturing process that has more process margin. A shim may be used during the formation of the insulating material to reduce the likelihood of the insulator adhering to the surfaces of the electrode portion during the manufacturing process.

In one set of embodiments, a component for a variable capacitance measuring device can comprise an electrode assembly including an electrode portion having a first width. The component can also comprise an insulating material surrounding a portion of the electrode assembly. The component can further comprise a solid material, such as a shim, lying between the electrode portion and the insulating material. The solid material may be wider than the electrode portion.

In another set of embodiments, a component for a variable capacitance measuring device can comprise an electrode assembly and a getter housing lying within the electrode assembly. The component can also comprise a ring surrounding portions of the electrode assembly and the getter housing.

In still another set of embodiments, a component for a variable capacitance measuring device can comprise a single-piece electrode assembly. The single-piece electrode assembly can comprise an electrode portion having an electrode surface.

In a further set of embodiments, a method of forming a component for a variable capacitance measuring device can comprise placing at least portions of a ring, an electrode assembly, a solid material, and an insulating material within a form. The electrode assembly can include an electrode portion having a surface. The solid material, such as a shim, may be wider than the electrode portion. The method can also comprise heating the insulating material. The solid material may substantially prevent the insulating material from contacting the surfaces of the electrode portion.

In still a further set of embodiments, a method of forming a component for a variable capacitance measuring device can comprise placing an insulating material between a ring and an electrode assembly. The method can also comprise crystallizing the insulating material to form a glass-ceramic material that contacts the ring and the electrode assembly.

In yet a further set of embodiments, a method can be used to form a variable capacitance measuring device. The device may comprise a gettering material, an electrode assembly, and an insulating material. A method for forming the variable capacitance measuring device can comprise placing a gettering material within an electrode assembly. The method can also comprise activating the gettering material while a portion of the gettering material is surrounded by an insulating material. A portion of the electrode assembly may lie between the gettering material and the insulating material.

The foregoing general description and the following detailed description are exemplary and explanatory only and are not restrictive of the invention, as defined in the appended claims.

BRIEF DESCRIPTION OF THE DRAWINGS

The present invention is illustrated by way of example and not limitation in the accompanying figures.

Skilled artisans appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Reference is now made in detail to the exemplary embodiments of the invention, examples of which are illustrated in the accompanying drawings. Wherever possible, the same reference numbers will be used throughout the drawings to refer to the same or like parts (elements).

A variable capacitance measuring device can comprise a glass-ceramic insulator having a coefficient of thermal expansion that closely matches the coefficient of thermal expansion of a metallic material used for the electrode assembly and reference-side ring. The glass-ceramic material may chemically bond to the surface of the metal to provide a hermetic seal and eliminate the need for a separate glass seal or grooves within the electrode assembly. Additionally, a single-piece electrode assembly can be used instead of a separate electrode assembly (for the electrical feedthrough) and electrode. A shim may be used during the formation of the insulating material to reduce the likelihood of the insulator flowing along a side surface of the electrode during the manufacturing process. Also, separate bake-out and getter activation cycles may be combined into a single heat cycle.

Figure 1:
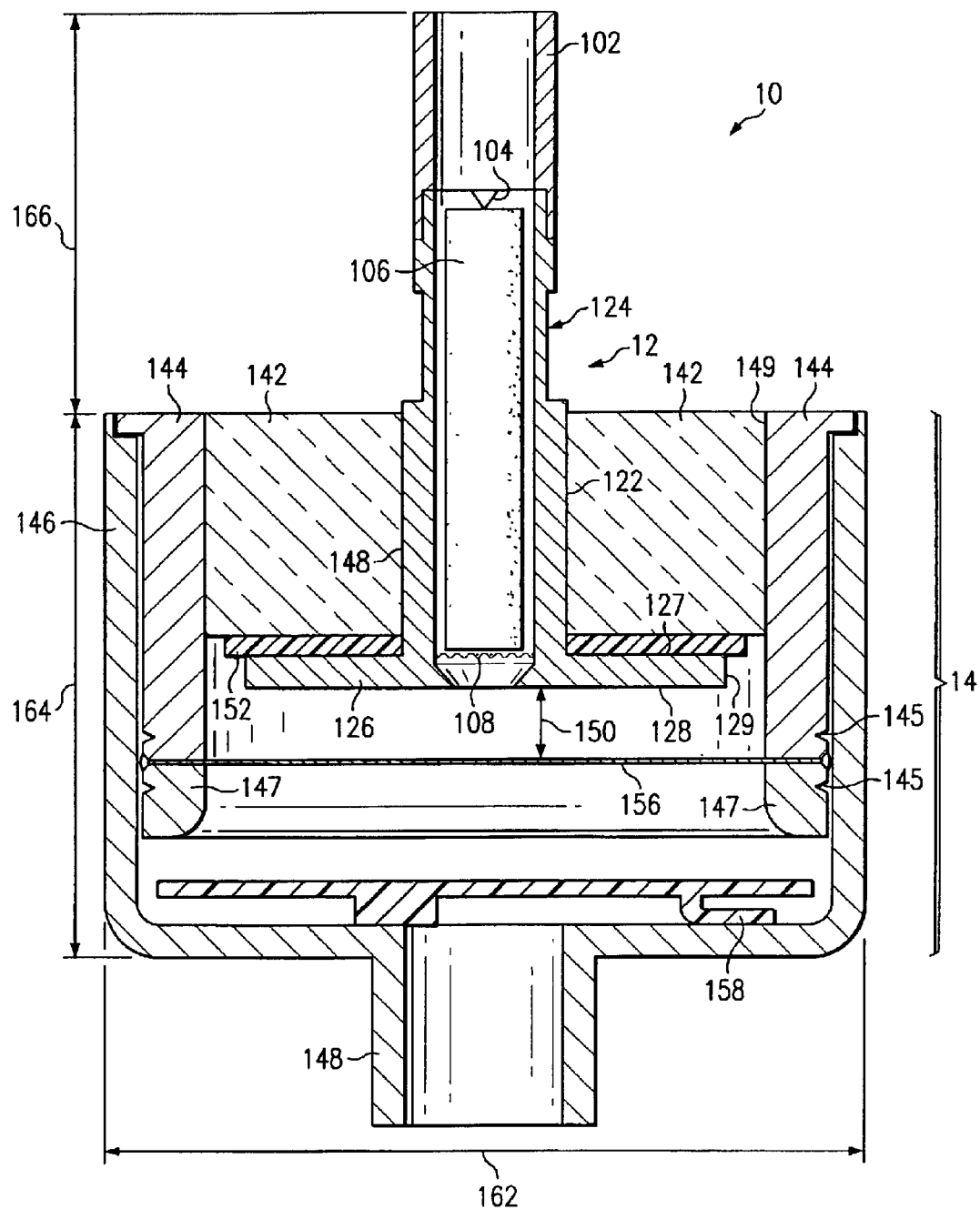
FIG. 1 includes an illustration of a cross-sectional view of a variable capacitance measuring device.

FIG. 1 includes an illustration of a cross-sectional view of a variable capacitance measuring device 10 that can be used as a force sensor, a pressure sensor, or the like. For simplicity throughout this specification, the variable capacitance measuring device 10 will be referred to as pressure sensor 10. Pressure sensor 10 can include a pinch-off connector 102 and an electrode assembly 12 that may be welded, brazed or soldered to each other. The pinch-off connector 102 can include a malleable material that can be welded shut. Connector 102 may include aluminum, copper, or the like.

The electrode assembly 12 can include a gettering housing 122, a tube 124, and an electrode portion 126. The gettering housing 122 can hold a gettering material 106. The gettering material 106, which can also be called a getter, can be used to absorb or adsorb contaminants or outgassing that may remain on the reference side of the diaphragm 156 after the sensor 10 is sealed. In this specification, the reference side of the diaphragm 156 includes the portions of the pressure sensor 10 on the side of the diaphragm 156 closer to the top of the illustration in FIG. 1, and the process side of the diaphragm 156 includes the portions of the pressure sensor 10 on the side of the diaphragm 156 closer to the bottom of the illustration in FIG. 1. In one non-limiting example of the gettering material, a SAES getter can be used and obtained from SAES Getters USA, Inc. of Colorado Springs, Colo. The gettering material 106 can be held in place by a retainer 104 and a solids barrier 108 as illustrated in FIG. 1. Alternatively, the retainer 104 may be removed, and a slight pinch in gettering housing 122 or pinch-off connector 102 may be used to help hold the gettering material 106 in place.

The solids barrier 108 can lie along one side of the gettering material 106 to reduce the likelihood of particles from the gettering material 106 reaching the diaphragm 156 of the pressure sensor 10. The solids barrier 108 may include a wire mesh screen, a sintered glass, a membrane, or the like. The solids barrier 108 may allow gas to flow through it but does not allow significantly large particles from gettering material 106 to reach the diaphragm 156 or gap 150.

The electrode assembly 12 can further include a tube 124 that lies between the pinch-off connector 102 and the insulator 142. The wall of the tube 124 should be as thin as possible. The tube 124 may have a diameter (width) that is narrower than the diameter (width) of the rest of the gettering housing 122 (most of which is surrounded by the insulator 142). The tube 124 can reduce any external forces applied to the pinch-off connector 102 from being transferred to the capacitor portion 14. If the capacitor portion 14 operates at an elevated temperature, the tube 124 can help to reduce the heat loss and protect electronics connected to the pinch off connector 102.

In one non-limiting embodiment, the electrode assembly 12 may comprise a single-piece electrode assembly. By single-piece electrode assembly, it is meant that the electrode assembly is formed from a single piece of material. The various portions of the electrode assembly are not fastened together by threads, welds, rivets, or the like. In an alternative embodiment (not shown), the electrode assembly 12 may include a combination of separate parts.

The electrode portion 126 is the portion of the electrode assembly 12 that lies below the insulator 142. The electrode portion 126 has an electrode surface 128 facing the diaphragm 156, a non-electrode-sensing (upper) surface 127 opposite the electrode surface 128, and a side surface 129 substantially perpendicular to the electrode surface 128. The significance of the surfaces will be addressed later in this specification.

The capacitor portion 14 can include an insulator 142, a reference-side ring 144, a process-side ring 147, weld preps 145, a housing 146, and a portion of the electrode assembly 12 that lies between the diaphragm 156 and the top of the insulator 142 as seen in FIG. 1. Weld preps 145 help to retain welding heat to the joint and reduce the overall welding power, thus minimizing distortion to the parts. The weld joint(s) of rings 144, 147, and diaphragm 156 substantially prevent any fluids from flowing from the process side of the diaphragm 156 to the gap 150. The electrode assembly 12 has an opening and a hollow shaft to allow for the evacuation of the reference side of the diaphragm 156.

An optional shim 152 may lie between and contact the electrode portion 126 and the insulator 142. The shim 152 can be used to control the position of the electrode portion 126 relative to the diaphragm 156. The shim 152 can be a solid material and may be an insulator or a conductor. If the shim 152 is a conductor, it should be spaced-apart from the reference-side ring 144 to prevent an electrical short between the electrode portion 126 and the diaphragm 156. The shim 152 may have a thickness in a range of approximately 75–100 microns (3–4 mils).

The process side of the diaphragm 156 can include a plasma shield 158 used to prevent potential damage to the sensor 10 if the sensor 10 is connected to a process using a plasma gas. A process tube 148 may be connected to the process side of the capacitor portion 14 and may be part of a flow measuring apparatus or as a stand-alone sensor for measuring force or pressure within a system. In one specific, non-limiting embodiment, the reference-side ring 144, the process-side ring 147, and the diaphragm 156 may be welded to each other as a subassembly. That subassembly may be welded to the housing 146. In this embodiment, all metal-to-metal connections are welded.

The capacitor portion 14 can include a variable capacitor structure for the pressure sensor 10. A combination of the electrode portion 126, diaphragm 156, and the gap 150 between the electrode portion 126 and the diaphragm 156 can be the variable capacitor for pressure sensor 10. The capacitance is a function of the area of the electrode surface 128. When the pressures on both sides of the diaphragm 156 are substantially the same, the distance between the electrode portion 126 and the diaphragm 156 may be in a range of approximately 50 to 250 microns.

In some embodiments, the pressure sensor 10 can be modified to be a differential pressure sensor. For example, the differential pressure sensor can be used in determining how much above or below atmospheric pressure a measured pressure is. The sensor 10 can be modified by removing the pinch-off connector 102, the retainer 104, and the gettering material 106. The solids barrier 108 may remain to substantially prevent particles from reaching the diaphragm 156 or gap 150. The reference side may be at substantially atmospheric pressure and the gas within the process tube 148 may be at a pressure above or below atmospheric pressure. In other embodiments, atmospheric pressure may be on the other side of the diaphragm 156. Electrical connections may be made to the electrode assembly 12 to provide a desired potential or other signal to the electrode portion 126. Another differential pressure sensing application is described later with respect to a mass flow controller.

Some of the physical features of the pressure sensor 10 are pointed out to note some of its advantages. First, the pressure sensor 10 has relatively smaller dimensions compared to a conventional pressure sensor. The following dimensions are exemplary rather than limiting. Typically the width 162 of the pressure sensor 10 may be no greater than approximately 35 mm. The height of the capacitor portion 14, as illustrated by dimension to 164, may be no greater than approximately 20 mm, and dimension 166 may be no greater than approximately 15 mm. In one specific embodiment, the width 162 is approximately 25 mm, and a combination of the dimensions 164 and 166 is approximately 25 mm. Therefore, a relatively smaller pressure sensor 10 can be made.

The materials used for the sensor 10 can be selected such that many of the materials within the capacitor portion 14 have coefficients of thermal expansion that are relatively the same as one another and provide a good seal. For example, each of the electrode assembly 12, the reference-side ring 144, the housing 146, the process-side ring 147, the process tube 148, the diaphragm 156, and the plasma shield 158 may be made of the same material. If the pressure sensor 10 is used in a corrosive environment, that material can include iron-nickel alloys, by themselves, or include any one or more of copper, chromium, molybdenum, silicon, tungsten, or the like. Examples may include INCONEL™, INCOLOY™, MONEL™, HASTELLOY™, stainless steel, or the like. In one specific embodiment, INCONEL 718 can be used. Any or all of the electrode assembly 12, the reference-side ring 144, the housing 146, the process-side ring 147, the process tube 148, the diaphragm 156, and the plasma shield 158 can be examples of electrically conductive portions. Note that different materials may be used for the various conductive portions.

In another embodiment (not shown), the capacitor portion 14 may include one or more insulating, resistive, or semiconductor materials. The materials of the housing should comprise a coefficient of thermal expansion that is similar to the coefficient of thermal expansion of the insulator 142. If any or all insulating, resistive, or semiconductor materials are used for the capacitor portion 14, a separate electrical connection may be made to control the signal or potential of the diaphragm 156 during operation. A wire or other interconnect (not shown) may be electrically connected to the diaphragm 156 and the process tube 148 or other external conductor. Welds, screws, rivets, conductive adhesives or epoxies may be used to make the electrical connections to the wire or other interconnect.

The insulator 142 can include a principal insulating material having a coefficient of thermal expansion similar to that of the other materials within the capacitor portion 14. This insulator should be stable to withstand stress and heat from the sensor manufacturing process.

In one embodiment, the insulator 142 may comprise a glass-ceramic material. Examples of the glass-ceramic materials include glasses comprising at least one non-silicate oxide compound including alumina ($Al_2O_3$), barium oxide (BaO), cobalt monoxide (CoO), boron oxide ($B_2O_3$), lithium oxide ($Li_2O$), potassium oxide ($K_2O$), phosphorus pentoxide ($P_2O_5$), or the like. In a specific non-limiting embodiment, the glass comprises silicon dioxide ($SiO_2$) in a range of approximately 55–80 weight percent. The non-silicate oxides can be used as dopants to affect the properties of the insulating material. One of these properties is the coefficient of thermal expansion. By selecting the proper dopants and concentrations, the coefficient of the glass-ceramic can be tailored to be close to materials that it will contact. U.S. Pat. Nos. 4,135,936, 4,414,282, and 5,820,989 include more details on the composition and formation of these glass-ceramic materials and are incorporated herein by reference. Some exemplary glass-ceramic materials are commercially available as S-8070™ and S-8073™ from Schott Glass Technologies, Inc. of Duryea, Pa.

Thermal coefficients of expansions for some exemplary materials are given. INCONEL™ 718 is approximately 13E-6 cm/cm/degree Celsius or 8E-6 in/in/degree Fahrenheit, MONEL™ is approximately 14E-6 cm/cm/degree Celsius or 7E-6 in/in/degree Fahrenheit, HASTELLOY™ is approximately 11–13E-6 cm/cm/degree Celsius or 6–7E-6 in/in/degree Fahrenheit, stainless steel 300 series (e.g., stainless steel 316 or the like) is approximately 18E-6 cm/cm/degree Celsius or 10E-6 in/in/degree Fahrenheit, stainless steel 400 series is approximately is approximately 11E-6 cm/cm/degree Celsius or 6E-6 in/in/degree Fahrenheit, alumina is approximately 7E-6 cm/cm/degree Celsius or 4E-6 in/in/degree Fahrenheit, and glass-ceramic materials are in a range of approximately 10E-6 to 20E-6 cm/cm/degree Celsius or 6E-6 to 10E-6 in/in/degree Fahrenheit. After reading this specification, skilled artisans understand how to select materials to reduce the likelihood of significant adverse effects due to temperature changes.

During operation of the pressure sensor 10 as shown in FIG. 1, the pressure sensor 10 can have the diaphragm 156, the reference-side ring 144, the process-side ring 147, and the housing 146 at a first potential, such as approximately ground potential. A terminal (not shown) can be attached to the pinch-off connector 102, the electrode assembly 12, or both. The terminal can allow the electrode assembly 12, which is electrically connected to the electrode portion 126, to have a different potential compared to the diaphragm 156, and that potential may be positive or negative relative to the potential on the diaphragm 156. Additionally, a time-varying signal or potential may be applied to the electrode assembly 12. The insulator 142 allows the electrode portion 126 to be electrically insulated from the diaphragm 156. Electrical connections between the electrode assembly 12 and the reference-side ring 144 or housing 146 should be avoided.

Figure 2:
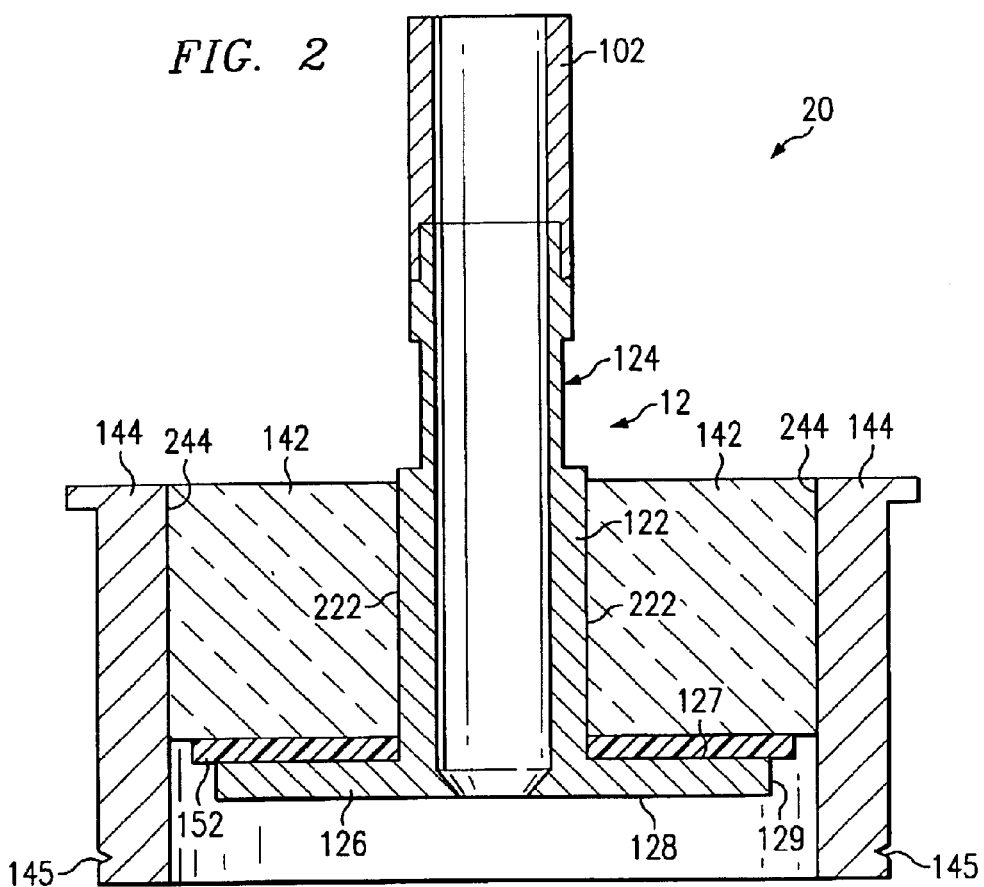
FIG. 2 includes an illustration of a component within the measuring device of FIG. 1.

FIG. 2 includes an illustration of a cross-sectional view of a component 20 within the pressure sensor 10. The component 20 can include the pinch-off connector 102, the electrode assembly 12, the reference-side ring 144, and the insulator 142 that contacts the electrode assembly 12 (at the main body portion) and the reference-side ring 144. The surfaces 222 and 244 of the electrode assembly 12 and the reference-side ring 144, respectively, are substantially smooth. Because the bonds between the insulator 142 and surfaces 222 and 244 are hermetic, grooves, channels, or other features are not required. Also, a separate glass-sealing compound is not needed. Note that the pinch-off connector 102 may not be present when the insulator 142 is being formed.

If desired, the surfaces 222 and 244 may be optionally tapered (not shown). For example, if the gap 150 is to be at a pressure lower than the ambient pressure outside the sensor 10, the width of the electrode assembly 12, the ring 144, or both may be wider near the gap 150 and narrower near the pinch-off connector 102. Conversely, if the gap 150 is to be at a pressure higher than the ambient pressure outside the sensor 10, the width of the electrode assembly 12, the ring 144, or both may be narrower near the gap 150 and width at locations contacting the insulator 142 near the pinch-off connector 102.

In forming the component 20, a jig, a vise, or other securing means may be used to hold the electrode assembly 12 and the reference-side ring 144 relatively stationary during an insulator-forming operation. Typically, at least portions of the electrode assembly 12 and the reference-side ring 144 lie within a form. At least a part of the reference-side ring 144 laterally surrounds and is spaced apart from at least a part of the electrode assembly 12 to form a spaced-apart region. The shim 152 can be present during the operation.

An insulating material with dopant(s) at the desired concentration(s) is (are) added to the form. A heat cycle is performed to convert the insulating material to the glass-ceramic material and to chemically bond the insulator 142 to the surfaces 222 and 244 of the electrode assembly 12 and reference-side ring 144, respectively. The form can have a graphite surface that may contact the glass-ceramic material. The form can be removed without the need for a silicon-based spray. Therefore, contamination concerns can be reduced.

Figure 3:
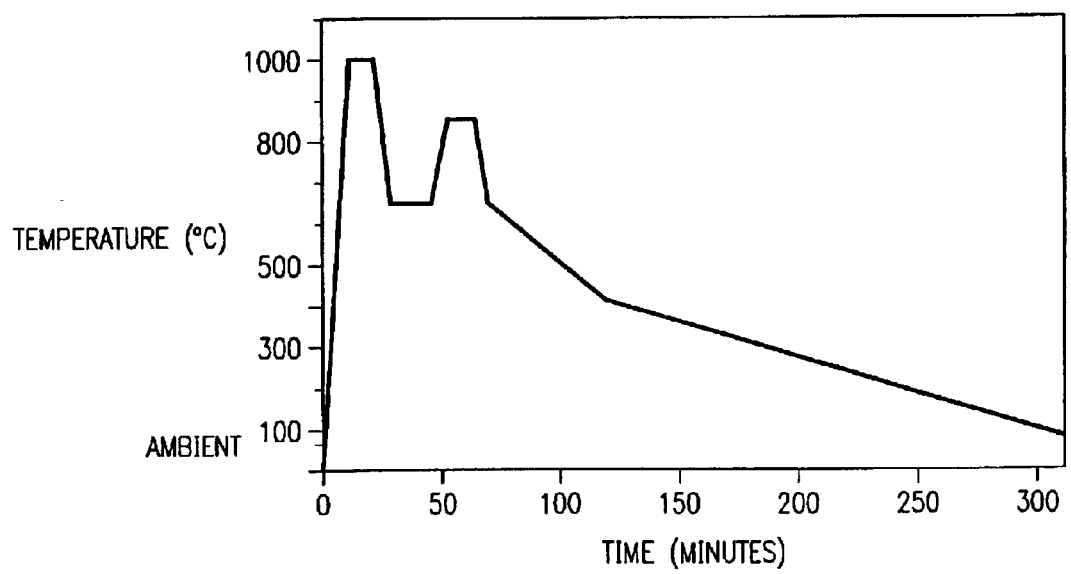
FIG. 3 includes an illustration of a heat cycle used to convert an insulating material to a glass-ceramic material.

An exemplary heat cycle for forming the glass-ceramic material is illustrated in FIG. 3. The heat cycle includes a ramp to approximately 1000 degrees Celsius and remains at that temperature for approximately 15 minutes. During this time, the insulating material may become very soft and fill the space desired. Because this temperature may be near or above the flow point of the insulating material, the shim 152 may substantially prevent any of the insulating material from contacting the upper surface 127 and the side surface 129 of the electrode portion 126. If the insulating material would contact the surfaces 127 and 129, the capacitance can be adversely affected when there is some mismatch between the coefficients of thermal expansion between the components. The wider shim 152 helps to reduce the likelihood of contact of the surfaces 127 and 129 to the insulator 142. Because the electrode assembly 12 can be a single-piece electrode assembly and the shim 152 may be in place during the glass-ceramic formation, better dimensional control between the diaphragm 156 and electrode surface 128 may be achieved.

The component with the insulating material can be cooled to approximately 650 degrees Celsius and remain at that temperature for approximately 20 minutes. During this time, nucleation sites for crystals of the glass-ceramic material can form. The temperature may be increased to approximately 850 degrees Celsius and remain at that temperature for approximately 20 minutes. During this time, the crystals can grow from the nucleation sites to form a polycrystalline glass-ceramic material. The component 20 with the glass-ceramic insulator 142 can then be cooled. Note that the glass-ceramic insulator 142 is still an insulating material but has specific properties (e.g., the glass ceramic is polycrystalline). During the entire heat cycle, an inert gas including nitrogen, a noble gas (i.e., helium or argon), or the like may be used to reduce the likelihood of undesired oxidation of metal in the pinch-off connector 102, the electrode assembly 12 or ring 144.

After the component 20 has sufficiently cooled, it can be combined with other parts of the sensor 10 during a fabrication process. The reference-side ring 144, the diaphragm 156, and the process-side ring 147 may be welded to one another.

Before sealing the reference side, the sensor 10 can be baked out to reduce outgassing. The heat cycle for the bake out may be combined with an activation operation for the gettering material 106. For example, a first portion of the heat cycle (i.e., the bake-out portion) may be performed at a temperature in a range of approximately 130–170 degrees Celsius for a time in a range of approximately 50–80 hours. During a second portion of the heat cycle, the temperature may be increased to a temperature in a range of approximately 230–270 degrees Celsius for a time in a range of approximately 1–3 hours. In one specific, non-limiting embodiment, the first portion may be performed at a temperature of approximately 150 degrees Celsius for a time of approximately 58 hours, and the second portion may be performed at a temperature of approximately 250 degrees Celsius for a time of approximately two hours. Note that the two portions may be performed during one heat cycle (i.e., without cooling to approximately room temperature (i.e., approximately 20–25 degrees Celsius) between the portions). Both the bake-out and activation cycles can be performed within the same oven.

Compare the previously described heat cycle with a conventional one. In a conventional process, the bake out and activation are performed as two different operations. The sensor may be heated in an oven to approximately 150 degrees Celsius for approximately 70 hours. The sensor may be cooled to approximately room temperature and moved to a separate radio-frequency induction heating apparatus that can locally heat the gettering material to approximately 600–900 degrees Celsius for approximately 1–10 minutes. Although the conventional method may be used, the conventional method is meant more for situations when the gettering material 106 lies completely outside the capacitor portion 14.

Referring to FIG. 1, the reference side of the diaphragm 156 is typically taken to a very low pressure. In many instances, this pressure may be no greater than approximately 10 micro-Pascals (microPa) or $10^{-7}$ Torr, and typically may be less than 1 microPa or $10^{-8}$ Torr. After the reference side is evacuated, the pinch-off connector 102 can be cold welded and sealed using a pliers-like tool. Under sufficient pressure of the tool, the metal of the pinch-off connector 102 will fuse together and shut. Other methods of sealing the device may be used.

The sensor 10 and its method of fabrication have advantages over conventional sensors and fabrication methods. The glass-ceramic material can be chemically bonded to each of the electrode assembly 12 and reference-side ring 144. A separate glass sealing material is not needed. The chemical bonding may also allow relatively smooth walls to be used for the electrode assembly 12 and the reference-side ring 144. Optionally, the surfaces may be slightly roughened to improve adherence between the glass and metal surfaces, but such roughening does not form macroscopic grooves or channels with depths of at least one millimeter. The electrode assembly 12 and the reference-side ring 144 do not need grooves or other "serpentine" patterns to artificially increase migration paths for water or other contaminants.

Another advantage of the embodiment illustrated is that the shim 152 helps to keep the insulating material 142 from contacting the surfaces 127 and 129 of the electrode portion 126. Therefore, when there is a slight mismatch of coefficients of thermal expansion among the parts, the electrode portion 126 should remain relatively flat when the temperature varies, minimizing temperature-induced capacitance changes. If the shim 152 were narrower than the electrode portion 126, manufacturing variability may allow the insulating material 142 to contact the side surface 129 in some sensors but not in other sensors. Such variability can significantly affect the electrical performance of the variable capacitor.

As previously described, the sensor 10 can be made smaller. An electrode assembly 12 may have one piece without grooves or channels and allow for a wider opening through its center. The wider opening can allow the gettering material 106 to reside at least partially within the capacitor portion 14 of the sensor 10. Accordingly, dimension 166 is further reduced.

The bake out of the sensor 10 and activation of the gettering material 106 may be performed during the same heat cycle using the same heating apparatus. Fabrication time is reduced because the getter activation operation is performed as part of a bake-out operation for the sensor 10. Additionally, manufacturing efficiencies may be achieved because less equipment is needed and less operator interfacing is required. Additionally, potential misprocessing (skipping one of the bake-out or activation operations) may be avoided because both operations are performed without any human interfacing between the bake-out and activation operations.

Figure 4:
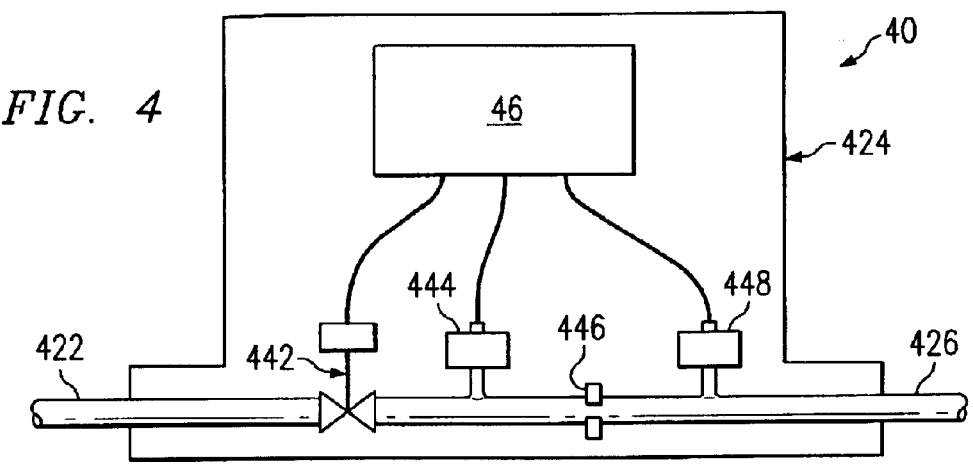
FIG. 4 includes a diagram of a flow measuring and control apparatus using the measuring device of FIG. 1.

FIG. 4 includes a diagram of a flow measuring and control apparatus 40, such as a mass flow controller. A fluid can flow through the inlet tube 422, the main body 424, and the outlet tube 426. Although not shown, electronics can be supplied to the apparatus 40 and may be electrically coupled to a controller 46 within the main body 424. The fluid can be designed to flow through a valve 442 and a restriction 446. The restriction 446 can include an orifice, a venturi, or the like. Two pressure sensors 444 and 448, similar to sensor 10 in FIG. 1, may lie on opposite sides of the restriction 446. The flow rate of the fluid can be determined by the pressure differential across the restriction 446. Electronic signals are transmitted to the controller 46. By knowing the tube diameter(s), type of restriction 446 (orifice, venturi, etc.) and diameter of the restriction 446, and the readings from sensors 444 and 448, the controller 46 or remote computer can determine a flow rate through the apparatus 40. The flow rate can be controlled by adjusting the valve 442. After reading all of this specification, skilled artisans appreciate that other flow measuring or control apparatuses may be used and be configured differently.

Figure 5:
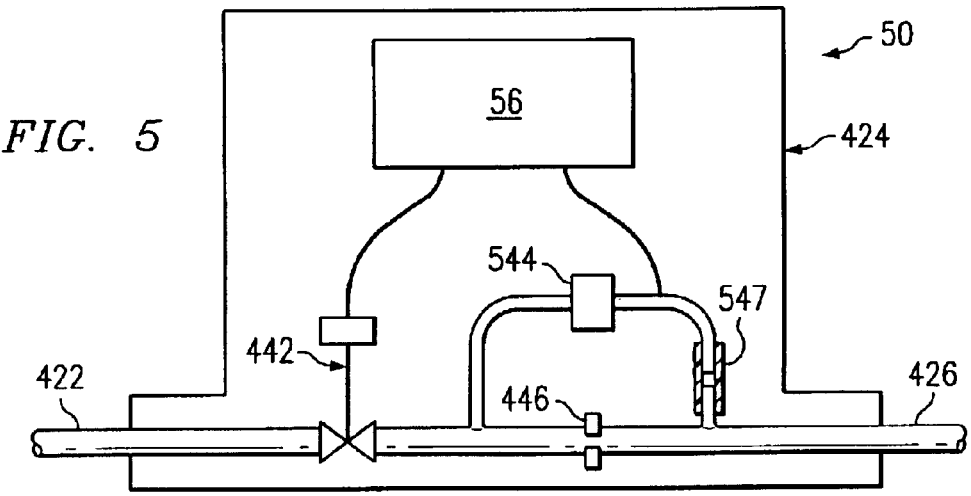
FIG. 5 includes an illustration of a perspective view of a portion of the variable capacitance measuring device and a heat sink and an electrical connection made to the device.

FIG. 5 includes a diagram of a flow measuring and control apparatus 50, such as a mass flow controller, where a single differential pressure sensor 544 (similar to the differential pressure sensor previously described) may be used instead of the combination of pressure sensors 444 and 448 in FIG. 4. Apparatus 50 may be used with dry gasses including clean dry air, nitrogen, argon, oxygen, hydrogen, or the like. The sensor 544 can have its end connected at points along opposite sides of the restriction 446. In this particular embodiment, the electrode side of the diaphragm is connected to the downstream (lower pressure) side of the restriction 446 to reduce the likelihood of condensation forming within the gap 150.

An electrical insulating section 547 of tubing may be used to substantially prevent the electrode portion 126 from being electrically shorted to the housing. Most plastic and polymeric tubing may be used. Alternatively, glass or another ceramic material may be used.

The flow rate of the fluid can be determined by the pressure differential across the restriction 446. Electronic signals are transmitted to the controller 56. By knowing the tube diameter(s) before and after the restriction, type of restriction 446 (orifice, venturi, etc.) and diameter of the restriction 446, and the reading from sensor 544, the controller 56 or remote computer can determine a flow rate through the apparatus 50. The flow rate can be controlled by adjusting the valve 442. After reading all of this specification, skilled artisans appreciate that other flow measuring or control apparatuses may be used and be configured differently.

Figure 6:
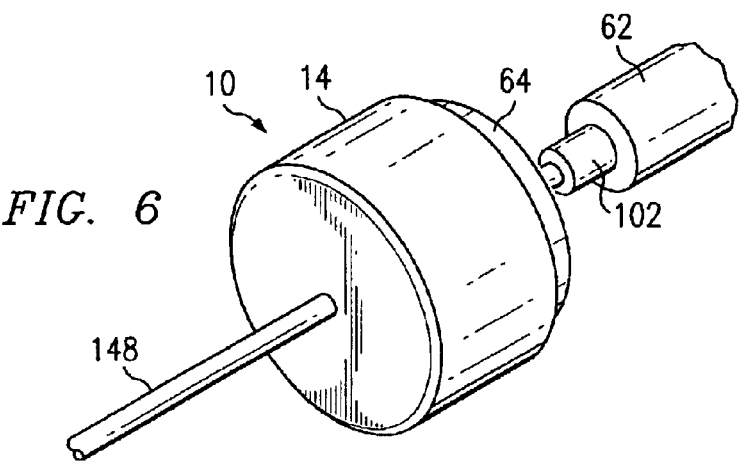
FIG. 6 includes an illustration of a perspective view of the pressure sensor including a heat sink and an electronic terminal.

FIG. 6 includes an illustration of a perspective view of the pressure sensor 10 including a heat sink 64 and an electronic terminal 62. In this embodiment, heat may be applied to the capacitor portion 14 of the sensor 10 to reduce the likelihood of condensation forming on the reference side of the diaphragm 156. Some exemplary temperatures for the capacitor portion 14 may be in a range of approximately 40–200 degrees Celsius. The heat sink 64 may laterally surround the tube 124 (as seen in FIG. 1 but not shown in FIG. 6) to help dissipate heat so that less heat is transferred to the pinch-off connector 102. This allows the electronics connected to the pinch-off connector 102 to stay at a cooler temperature.

If the heat sink 64 includes a conductive material, the heat sink 64 should be positioned so that it does not electrically short the electrode assembly 12 to the reference-side ring 144 or the housing 146 of the capacitor portion 14. If the heat sink 64 includes a thermally conductive but not electrically conductive material, such as aluminum nitride, FR4, or the like, such concerns with an electrical short are substantially reduced. The same heat sink 64 or the like, can absorb the getter activation heat and reduce the heat transferred to the capacitor portion 14, thus substantially eliminating thermal shock.

In the foregoing specification, the invention has been described with reference to specific embodiments. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims.

As used herein, the terms "comprises," "comprising," "includes," "including," "has," "having" or any other variation thereof, are intended to cover a non-exclusive inclusion. For example, a process, process, article, or apparatus that comprises a list of elements is not necessarily limited only to those elements but may include other elements not expressly listed or inherent to such process, process, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

What is claimed is:

1. A component for a variable capacitance measuring device comprising:

an electrode assembly including an electrode portion having a first width;

a glass-ceramic insulating material surrounding a portion of the electrode assembly; and a solid material lying between the electrode portion and the insulating material, wherein the solid material has a second width that is wider than the first width.

2. The component of claim 1, wherein the solid material contacts the electrode portion and the insulating material.

3. The component of claim 1, further comprising a gettering material within the electrode assembly.

4. The component of claim 3, wherein the insulating material surrounds at least a portion of the gettering material.

5. The component of claim 1, wherein the electrode assembly is a single-piece electrode assembly.

6. A variable capacitance measuring device comprising the component of claim 1.

7. A component for a variable capacitance measuring device comprising:

an electrode assembly;

a getter housing lying within the electrode assembly; and a ring laterally surrounding portions of the electrode assembly and the getter housing.

8. The component of claim 7, wherein:

the electrode assembly is a single-piece electrode assembly that comprises a first electrode; and the ring is electrically connected to a second electrode.

9. The component of claim 7, further comprising:

an insulating material lying between and contacting the electrode assembly and the ring; and the insulating material surrounds a portion of the gettering housing.

10. A variable capacitance measuring device comprising the component of claim 7.

11. A component for a variable capacitance measuring device comprising a single-piece electrode assembly, wherein:

the single-piece electrode assembly comprises an electrode portion; and the electrode portion has an electrode surface.

12. The component of claim 11, further comprising:

a gettering housing lying within the single-piece electrode assembly; and an insulating material that surrounds at least part of the gettering housing.

13. A variable capacitance measuring device comprising the component of claim 11.

14. The component of claim 12, further comprising a pinch-off tube connected to the electrode assembly, wherein the gettering housing, the electrode portion and the pinch-off tube are axially aligned.

15. The component of claim 14, wherein the single-piece electrode assembly forms the gettering housing.

16. The component of claim 15, wherein the insulating material is a glass ceramic insulating material.

* * * * *

UNITED STATES PATENT AND TRADEMARK OFFICE
CERTIFICATE OF CORRECTION

PATENT NO.   : 6,837,111 B2
DATED        : January 4, 2005
INVENTOR(S)  : Hai Mei It is certified that error appears in the above-identified patent and that said Letters Patent is hereby corrected as shown below:

<u>Title page, Item [54] and Column 1, Line 2,</u>
Title, after the last word "DEVICE", insert -- COMPRISING A GLASS-CERAMIC INSULATOR --

Signed and Sealed this

Third Day of May, 2005

JON W. DUDAS
*Director of the United States Patent and Trademark Office*